United States Patent
Ban et al.

(10) Patent No.: US 9,969,308 B2
(45) Date of Patent: May 15, 2018

(54) LOCK DEVICE

(71) Applicant: SHIROKI CORPORATION, Fujisawa-shi (JP)

(72) Inventors: Masahiro Ban, Fujisawa (JP); Takayuki Sakurai, Fujisawa (JP); Hiroyuki Suzuki, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 152 days.

(21) Appl. No.: 14/651,639

(22) PCT Filed: Dec. 11, 2013

(86) PCT No.: PCT/JP2013/083257
§ 371 (c)(1),
(2) Date: Jun. 11, 2015

(87) PCT Pub. No.: WO2014/092134
PCT Pub. Date: Jun. 19, 2014

(65) Prior Publication Data
US 2015/0306991 A1 Oct. 29, 2015

(30) Foreign Application Priority Data
Dec. 12, 2012 (JP) ................. 2012-271339

(51) Int. Cl.
*E05C 3/16* (2006.01)
*B60N 2/44* (2006.01)
*B60N 2/015* (2006.01)
*B60N 2/36* (2006.01)
*B60N 2/22* (2006.01)
*E05B 79/08* (2014.01)
*E05B 85/26* (2014.01)
*E05B 15/04* (2006.01)

(52) U.S. Cl.
CPC ......... *B60N 2/444* (2013.01); *B60N 2/01583* (2013.01); *B60N 2/22* (2013.01);
(Continued)

(58) Field of Classification Search
CPC ......... Y10T 292/1043; Y10T 292/1047; Y10T 292/1078; B60N 2/01583; B60N 2/366;
(Continued)

(56) References Cited

U.S. PATENT DOCUMENTS 2,344,806 A * 3/1944 Dall .................. E05B 85/24
292/198
3,367,699 A * 2/1968 Leslie .................. E05B 77/48
292/216

(Continued)

FOREIGN PATENT DOCUMENTS

EP 1586484 A2 * 10/2005 ......... B60N 2/01583
EP 2899064 A1 * 7/2015 ............. B60N 2/366

(Continued)

OTHER PUBLICATIONS

International Search Report (ISR) (PCT Form PCT/ISA/210), in PCT/JP2013/083257, dated Mar. 4, 2014.

*Primary Examiner* — Alyson M Merlino
(74) *Attorney, Agent, or Firm* — McGinn I.P. Law Group, PLLC

(57) ABSTRACT

A lock device includes a base, a first rotation member, a second rotation member, a first elastic member, and a second elastic member. Protrusions are provided on one of the base and one of the first rotation member and the second rotation member. The protrusions are protruded in a direction parallel to the rotation axis of the first rotation member. An end of one of the first elastic member and the second elastic member is fixed to the protrusions. The protruding length in the rotation axis direction of the protrusions is longer than the length in the rotation axis direction of one of the first elastic member and the second elastic member.

5 Claims, 5 Drawing Sheets

(52) U.S. Cl.
CPC .............. *B60N 2/366* (2013.01); *E05B 79/08* (2013.01); *E05B 85/26* (2013.01); *E05B 2015/042* (2013.01)

(58) Field of Classification Search
CPC ............ B60N 2/01516; B60N 2/01541; B60N 2/0155; B60N 2/2245; B60N 2/305; B60N 2/22; B60N 2/444; E05B 85/20; E05B 85/24; E05B 85/26; E05B 2015/042; E05B 79/08
See application file for complete search history.

(56) References Cited

U.S. PATENT DOCUMENTS

| | | | | |
|---|---|---|---|---|
| 3,371,948 A | * | 3/1968 | Velavicius | ............ E05B 85/243 292/216 |
| 3,384,405 A | * | 5/1968 | Schiele | .................. E05B 77/48 292/201 |
| 3,386,760 A | * | 6/1968 | Bessette | ................ E05B 85/243 292/210 |
| 4,995,654 A | * | 2/1991 | Nishigami | .............. E05B 77/12 292/216 |
| 2006/0208505 A1 | | 9/2006 | Christoffel et al. | |
| 2016/0010370 A1 | * | 1/2016 | Sugiura | .................... E05C 3/30 292/96 |

FOREIGN PATENT DOCUMENTS

| | | | | |
|---|---|---|---|---|
| FR | 2778614 A1 | * | 11/1999 | ............. B60N 2/305 |
| GB | 994563 A | * | 6/1965 | ............. E05B 85/24 |
| GB | 2345723 A | * | 7/2000 | ..................... B60N 2/366 |
| JP | S63-89075 U | | 6/1988 | |
| JP | H11-256904 A | | 9/1999 | |
| JP | 4633739 B2 | | 2/2011 | |
| JP | 2012-35651 A | | 2/2012 | |

* cited by examiner

LOCK DEVICE

TECHNICAL FIELD

The present invention relates to a lock device.

BACKGROUND ART

According to patent Literature 1, etc., a lock device capable of locking the rotation of a vehicle seat, etc., has been known. This lock device includes a base, a hook rotatably provided on the base and a pawl rotatably provided on the base. The hook has a slit into which a striker is able to be introduced. The pawl prevents the rotation of the hook. In this lock device, in order to reduce the size thereof, a spring for urging the hook in the rotation direction is disposed between the base and the hook and a spring for urging the pawl in the rotation direction is disposed between the base and the pawl.

CITATION LIST

Patent Literature

Patent Literature 1: Japanese Patent Publication No. 4633739

DISCLOSURE OF INVENTION

Problems to be Solved by Invention

In the lock device having such configurations, the spring is unable to reliably apply a force to the hook when a space in which the spring for urging the hook is accommodated is reduced by the action of an external force. Also, the spring is unable to reliably apply a force to the pawl when a space in which the spring for urging the pawl is accommodated is reduced by the action of an external force. Therefore, it is necessary to reliably secure a space between the base and the hook and a space between the base and the pawl.

Accordingly, in the lock device disclosed in Patent Literature 1, two shafts for rotatably supporting the hook and the pawl, respectively, are provided on the base. Each of these shafts includes a small-diameter part, of which a leading end is fitted into holes that are formed in the hook and the pawl, and a large-diameter part of which a base portion has a diameter greater than the holes of the hook and the pawl. The hook and the pawl are respectively supported at a stepped portion that is a boundary between the large-diameter part and the small-diameter part of these shafts.

Additionally, it is necessary to provide the base, the hook and the pawl, respectively, with a locking portion to which an end of the spring is locked.

Specifically, the structure of the lock device becomes complex since a structure for securing a space which allows each spring to be reliably actuated, between the base and hook and between the base and the pawl, is required and a structure for locking the end of each spring is required.

The present invention has been made in consideration of the above-described problem and an object thereof is to provide a lock device having a simple structure.

Means for Solving the Problems

In order to solve at least one of the above problems, a lock device according to one aspect of the present invention includes a plate-shaped base having a front surface and a back surface;

a first rotation member and a second rotation member, which are provided on the front surface of the base and rotated around a rotation axis parallel to each other, wherein at least a portion of the first rotation member and the second rotation member contacts each other, so that the relative rotation in at least one direction of the first rotation member and the second rotation member is able to be locked;

a striker, which is able to be moved in a striker receiving portion provided on at least one of the first rotation member and the second rotation member;

a first elastic member, which is provided in a space between the base and the first rotation member to be elastically deformable;

a second elastic member, which is provided in a space between the base and the second rotation member to be elastically deformable, wherein, when the relative rotation between the first rotation member and the second rotation member is locked, the lock device becomes a locked state where the striker is prevented from being detached from the striker receiving portion, wherein, when the locking between the first rotation member and the second rotation member is released, the lock device becomes an unlocked state where the striker is allowed to be detached from the striker receiving portion, wherein the first elastic member applies a force to the first rotation member to rotate the first rotation member in one direction around the rotation axis, wherein the second elastic member applies a force to the second rotation member to rotate the second rotation member in one direction or the other direction around the rotation axis, wherein a protrusion is provided on one of the base and one of the first rotation member and the second rotation member, the protrusion being protruded in a direction parallel to the rotation axis and an end of one of the first elastic member and the second elastic member being fixed to the protrusion, and wherein a protruding length in the rotation axis direction of the protrusion is longer than a length in the rotation axis direction of one of the first elastic member and the second elastic member.

Effects of Invention

According to the present invention, a lock device having a simple structure is provided.

Other effects of the present invention will become more apparent from the embodiments for carrying out the invention (to be described below) and the accompanying drawings.

EMBODIMENT FOR CARRYING OUT INVENTION

First Embodiment

Figure 1:
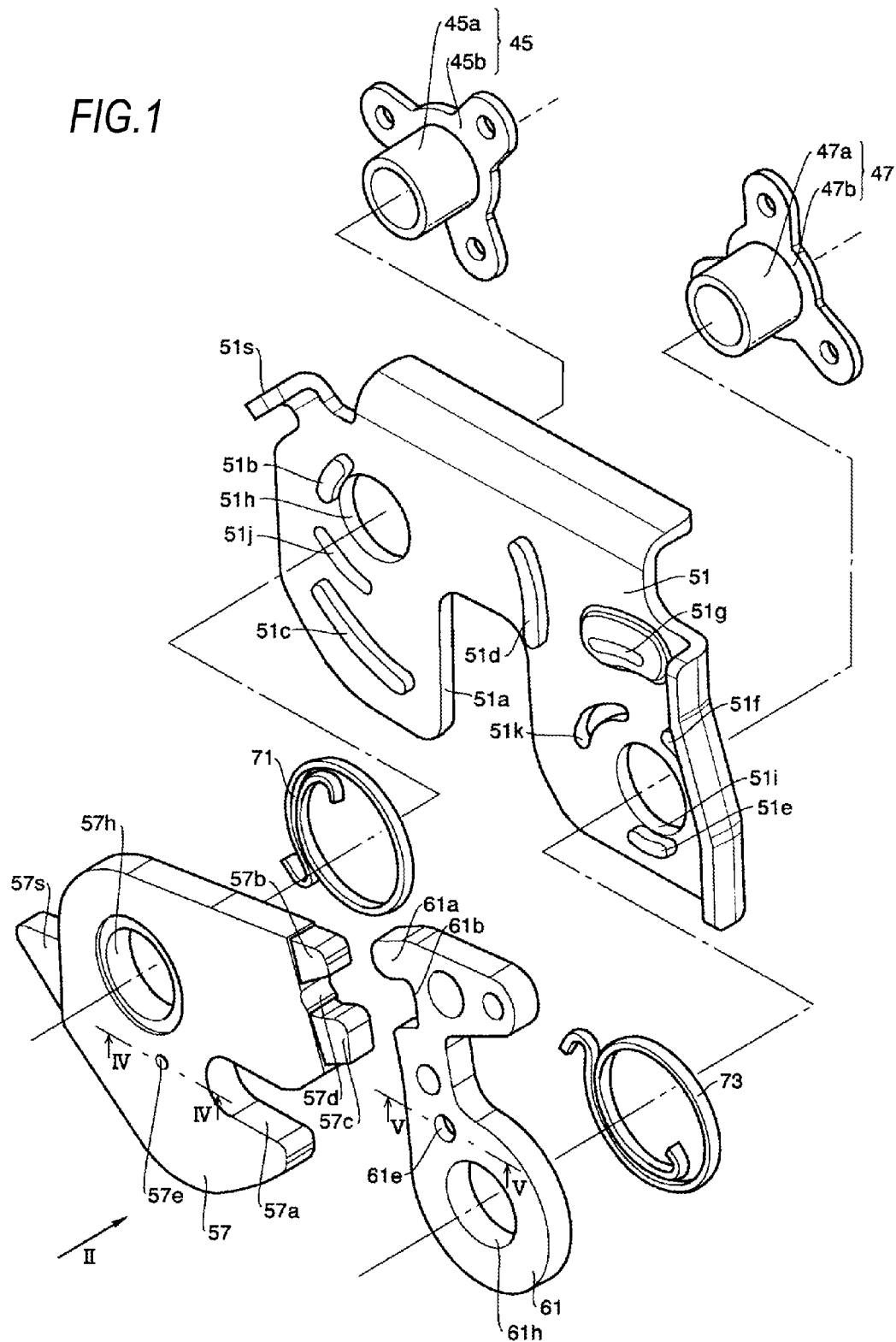
FIG. 1 is an exploded perspective view of a lock device according to a first embodiment of the present invention.
Figure 2:
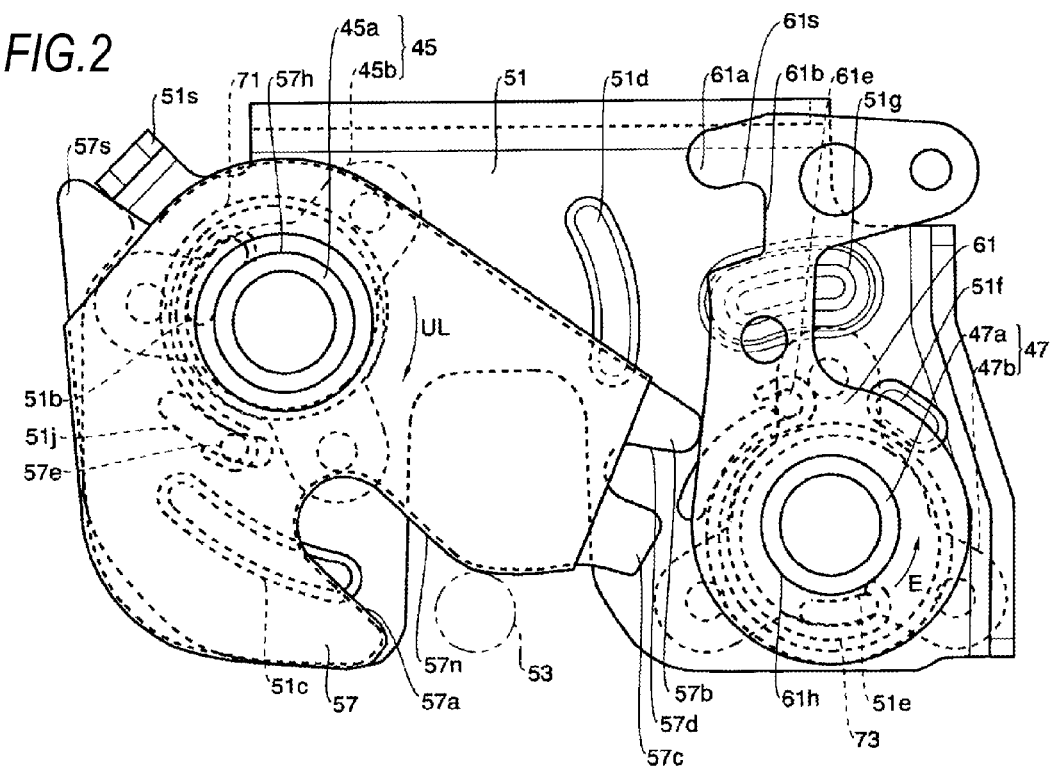
FIG. 2 is a view showing an unlocked state of the lock device shown in FIG. 1, as seen from a direction II of FIG. 1.
Figure 3:
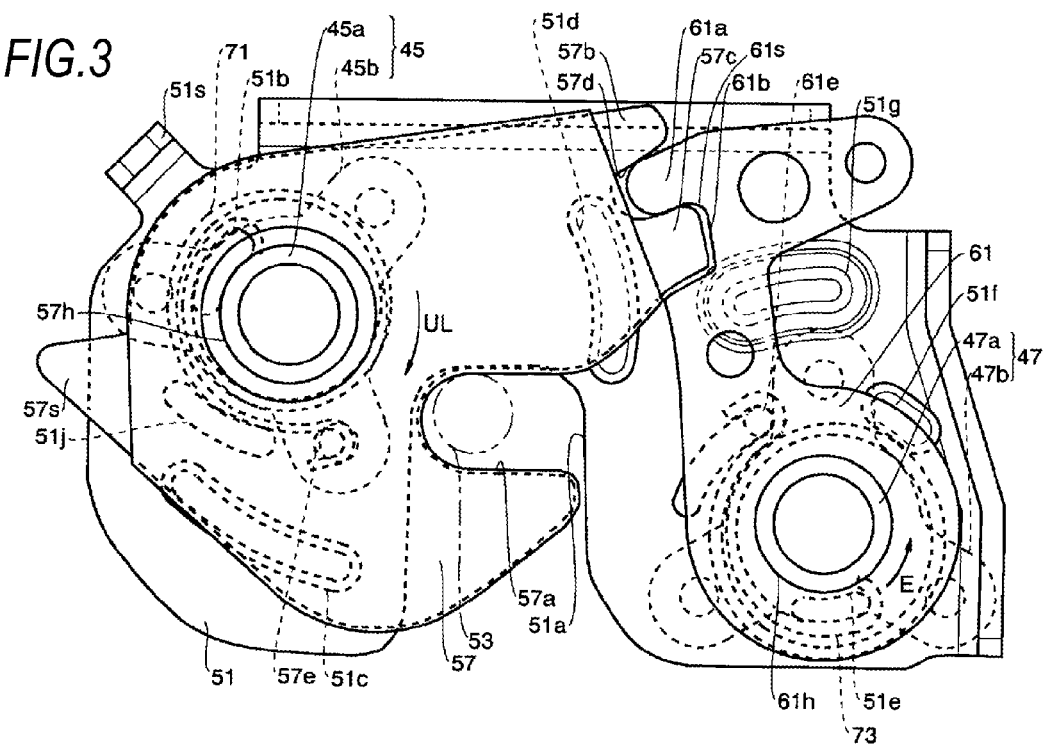
FIG. 3 is a view showing a locked state of the lock device shown in FIG. 2.

Next, a first embodiment of the present invention will be described with reference to the drawings. FIG. 1 is an exploded perspective view of a lock device of the first embodiment. FIG. 2 is a view showing an unlocked state of the lock device shown in FIG. 1, as seen from a direction II of FIG. 1. FIG. 3 is a view showing a locked state of the lock device shown in FIG. 2.

(Overall Structure)

A lock device of the present embodiment is able to be used to lock the rotation of a door relative to a vehicle body frame, for example. In addition, the lock device is able to be used to lock the rotation of a seat or the rotation of a trunk lid or an engine hood. Further, the lock device of the present invention is able to be used to lock the rotation member other than the objects mounted to a vehicle. In the following description, a lock device of locking the rotation of a door relative to a vehicle body frame will be described as an example.

As shown in FIG. 1, the lock device includes a base 51 and a striker 53. For example, the base 51 is fixed to a vehicle body frame and the striker 53 is fixed to a door. As the door is moved relative to the vehicle body frame, the striker 53 is moved relative to the base 51.

The base 51 is a plate-shaped member having a front surface and a back surface. In FIG. 1, a surface facing the lower left is the front surface, and a surface facing the upper right is the back surface. The base 51 is provided with a notch 51a, which penetrates the base 51 from the front surface to the back surface and in which the striker 53 is able to be moved in the notch 51a. In the following description, with respect to the notch 51a in FIG. 1 as a border, a left side of the base 51 is referred to as a left portion of the base 51 and a right side of the base 51 is referred to as a right portion of the base 51.

A hook 57 (an example of a first rotation member) is provided on the front surface of the left portion of the base 51. The hook 57 is a plate-shaped member extending substantially parallel to the base 51. The hook 57 is formed with a hole 57h penetrating from the front surface to the back surface. The base 51 is also formed with a through hole 51h. The diameter of the hole 51h is set to be substantially the same as the diameter of the hole 57h of the hook 57.

A bushing 45 is provided on the back surface of the left portion of the base 51. The bushing 45 includes a cylindrical portion 45a and a mounting portion 45b. The cylindrical portion 45a is inserted into the hole 51h of the base 51. The mounting portion 45b is formed at a base portion of the cylindrical portion 45a and abutted against the back surface of the base 51.

The outer diameter of the cylindrical portion 45a is set to be slightly smaller than the hole 57h of the hook 57. The cylindrical portion 45a is inserted through the hole 51h of the base 51 and then inserted through the hole 57h of the hook 57. A leading end of the cylindrical portion 45a passing through the hole 57h of the hook 57 is caulked. Therefore, the hook 57 is able to be rotated around a rotation axis that extends in a direction intersecting the base 51.

Further, in the present embodiment, the position of the hook 57 shown in FIG. 2 is referred to as an unlock position and the position of the hook 57 shown in FIG. 3 is referred to as a lock position.

A pawl 61 (an example of a second rotation member) is rotatably provided on the front surface of the right portion of the base 51. The pawl 61 is a plate-shaped member extending parallel to the base 51. The pawl 61 is formed with a hole 61h penetrating from the front surface to the back surface. The base 51 is also formed with a hole 51i penetrating from the front surface to the back surface. The diameter of the hole 51i of the base 51 is set to be substantially the same as the diameter of the hole 61h of the pawl 61.

A bushing 47 is provided on the back surface of the right portion of the base 51. The bushing 47 includes a cylindrical portion 47a and a mounting portion 47b. The cylindrical portion 47a is inserted into the hole 51i of the base 51. The mounting portion 47b is formed at a base portion of the cylindrical portion 47a and abutted against the back surface of the base 51.

The outer diameter of the cylindrical portion 47a is set to be slightly smaller than the hole 61h of the pawl 61. The cylindrical portion 47a is inserted through the hole 51i of the base 51 and then inserted through the hole 61h of the pawl 61, and a leading end of the cylindrical portion 47a passing through the hole 61h of the pawl 61 is caulked. Therefore, the pawl 61 is able to be rotated around a rotation axis that extends in a direction intersecting the base 51.

The hook 57 is formed with a slit 57a (an example of a striker receiving portion) penetrating from the front surface to the back surface. The striker 53 is able to be moved in the slit 57a.

Further, a first convex portion 57b and a second convex portion 57c are formed on an outer peripheral portion of the hook 57. A concave portion 57d is formed between the first convex portion 57b and the second convex portion 57c. The concave portion 57d is gradually thinned from the outer peripheral surface toward the inside. Furthermore, a stopper protrusion 57s is formed on the outer peripheral portion of the hook 57. The stopper protrusion 57s extends in a radial direction relative to the rotation axis of the hook 57.

A convex portion 61a is formed at a surface of the pawl 61 opposite to the hook 57. The convex portion 61a is able to be engaged and disengaged from the concave portion 57d of the hook 57. The convex portion 61a has an arc-shaped leading end and a recessed root portion 61s. Further, a concave portion 61b is formed at a surface of the pawl 61 opposite to the hook 57. The second convex portion 57c of the hook 57 is able to be introduced into the concave portion 61b As described above, the hook 57 and the pawl 61 are provided on the front surface of the plate-shaped base 51. Further, each of the hook 57 and the pawl 61 is a member that is able to be rotated around the rotation axis parallel to each other. Furthermore, at least a portion of the hook 57 and the pawl 61, for example, the convex portion 61a and the concave portion 57d are in contact with a part of each other, so that it is possible to lock the relative rotation in at least one direction of the hook 57 and the pawl 61.

(First Elastic Member and Second Elastic Member)

A first spring 71 (an example of a first elastic member) is provided between the base 51 and the hook 57. The first spring 71 applies a force to the hook 57 so as to rotate the hook 57 in a clockwise direction (an arrow UL direction in FIG. 2 and FIG. 3). The first spring 71 is provided in a posture where a center axis of the first spring 71 is parallel to a rotation axis of the hook 57. The first spring 71 is provided in a space between the base 51 and the hook 57 to be elastically deformable.

Further, a second spring 73 (an example of a second elastic member) is provided between the base 51 and the pawl 61. The second spring 73 applies a force to the pawl 61 so as to rotate the pawl 61 in a counterclockwise direction (an arrow E direction in FIG. 2 and FIG. 3). The second spring 73 is provided in a posture where a center axis of the second spring 73 is parallel to a rotation axis of the pawl 61. The second spring 73 is provided in a space between the base 51 and the pawl 61 to be elastically deformable.

As the first spring 71 and the second spring 73, an elastic body such as a flat spiral spring, a torsion spring or a leaf spring, for example, is able to be used.

(Protrusion)

On the front surface of the base 51 where the hook 57 and the pawl 61 are provided, a first protrusion 51b (an example of a protrusion), a second protrusion 51c (an example of an auxiliary protrusion) and a third protrusion 51d (an example of an auxiliary protrusion), which are protruded toward the hook 57 in the rotation axis direction of the hook 57, are formed around the hole 51h for the hook 57. The hook 57 is supported at three points by the apices of these three protrusions 51b, 51c, 51d. The height (dimension of the protrusion in the rotation axis direction of the hook 57) from the front surface of the base 51 to the apices of these three protrusions is set to be greater than the dimension of the first spring 71 in the rotation axis direction of the hook 57.

Figure 4:
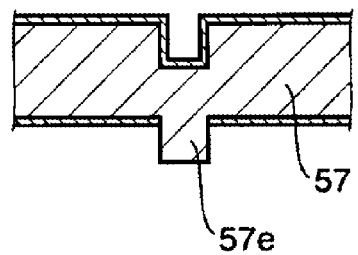
FIG. 4 is a sectional view taken along a cutting line IV-IV in FIG. 1.

Further, the base 51 is formed with an arc-shaped elongated through-hole 51j centered on the center (rotation axis of the hook 57) of the hole 51h. As shown in FIG. 4, the hook 57 is formed with a protrusion 57e protruding toward the base 51. The height of the protrusion 57e is set to the height in which the protrusion does not abut against the base 51. The distance between the protrusion 57e and the rotation axis of the hook 57 is set to be the same as the radius of the arc-shaped elongated hole 51j centered on the center of the hole 51h. Accordingly, when the hook 57 is rotated, the trajectory drawn by the protrusion 57e is overlapped with the arc-shaped elongated hole 51j of the base 51, as viewed from the rotation axis direction.

On the front surface of the base 51 where the hook 57 and the pawl 61 are provided, a fourth protrusion 51e (an example of a protrusion), a fifth protrusion 51f (an example of an auxiliary protrusion) and a sixth protrusion 51g (an example of an auxiliary protrusion), which are protruded toward the pawl 61 in the rotation axis direction of the pawl 61, are also formed around the hole 51i for the pawl 61. The pawl 61 is supported at three points by the apices of these three protrusions 51e, 51f, 51g. The height (dimension of the protrusion in the rotation axis direction of the pawl 61) from the front surface of the base 51 to the apices of these three protrusions 51e, 51f, 51g is set to be greater than the dimension of the second spring 73 in the rotation axis direction of the pawl 61.

Figure 5:
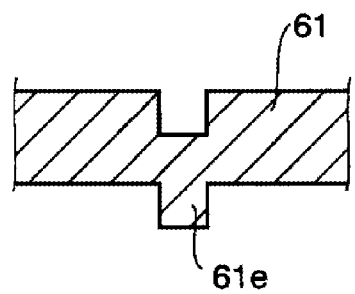
FIG. 5 is a sectional view taken along a cutting line V-V in FIG. 1.

Further, the base 51 is formed with an arc-shaped elongated through-hole 51k centered on the center (rotation axis of the pawl 61) of the hole 51i. As shown in FIG. 5, the pawl 61 is formed with a protrusion 61e protruding toward the base 51. The height of the protrusion 57e is set to the height in which the protrusion does not abut against the base 51. The distance between the protrusion 61e and the rotation axis of the pawl 61 is set to be the same as the radius of the arc-shaped elongated hole 51k centered on the center of the hole 51i. Accordingly, when the pawl 61 is rotated, the trajectory drawn by the protrusion 61e is overlapped with the arc-shaped elongated hole 51k of the base 51, as viewed from the rotation axis direction.

An inner end of the first spring 71 described above is locked to the first protrusion 51b of the base 51, and an outer end thereof is locked to the protrusion 57e of the hook 57. The first spring 71 urges the hook 57 in the clockwise direction.

Further, an inner end of the second spring 73 described above is locked to the fourth protrusion 51e of the base 51 and an outer end thereof is locked to the protrusion 61e of the pawl 61. The second spring 73 urges the pawl 61 in the counterclockwise direction. Furthermore, in the present embodiment, not the fourth protrusion 51e to which the inner end of the second spring 73 is locked but the fifth protrusion 51f is formed at a position where an outer peripheral surface of the second spring 73 is always in contact with the protrusion 51f.

As described above, the first protrusion 51b to which the inner end of the first spring 71 is fixed is provided on the base 51. The protruding length (length from the front surface of the base 51 to the apex of the first protrusion 51b) of the first protrusion 51b in the rotation axis direction of the hook 57 is set to be greater than the length of the first spring 71 in the rotation axis direction of the hook 57.

Further, in the present embodiment, similar to the first spring 71, the fourth protrusion 51e to which the inner end of the second spring 73 is fixed is provided on the base 51. The protruding length of the fourth protrusion 51e in the rotation axis direction of the pawl 61 is set to be greater than the length of the second spring 73 in the rotation axis direction of the pawl 61.

(Locked State and Unlocked State)

Next, an operation of the above configuration will be described.

In the state of FIG. 3 where the hook 57 is in the lock position, the concave portion 57d of the hook 57 is engaged with the convex portion 61a of the pawl 61. In this locked state, the hook 57 is prevented from being rotated and the striker 53 is prevented from being detached from the slit 57a of the hook 57. That is, when the relative rotation between the hook 57 and the pawl 61 is locked, the lock device becomes the locked state where the striker 53 is prevented from being detached from the slit 57a.

Here, when the pawl 61 is rotated in the opposite direction (clockwise direction) of the arrow E against the urging force of the second spring 73, the engagement between the concave portion 57d of the hook 57 and the convex portion 61a of the pawl 61 is released. Then, the hook 57 is rotated in the clockwise direction by the urging force of the first spring 71, so that the lock device becomes the unlocked state shown in FIG. 2. Accordingly, the striker 53 is allowed to be detached from the slit 57a of the hook 57. That is, when the locking of the relative rotation between the hook 57 and the pawl 61 is released, the lock device becomes the unlocked state where the striker 53 is allowed to be detached from the slit 57a.

Meanwhile, in the present embodiment, a stopper 51s (an example of a stopper portion) is formed on an outer peripheral portion of the base 51. The stopper 51s is bent to the front surface where the hook 57 is provided. The stopper protrusion 57s of the hook 57 in the unlock position is abutted against the stopper 51s, so that the further rotation in the unlock position direction is prevented.

On the contrary, in the unlocked state shown in FIG. 2, the hook 57 is rotated in the lock position direction against the urging force of the first spring 71 when a mouth-near surface 57n of the slit 57a of the hook 57 is pressed by the striker 53. Further, the concave portion 57d of the hook 57 is engaged with the convex portion 61a of the pawl 61, so that the hook 57 is prevented from being rotated in the unlock direction. As a result, the lock device becomes the locked state where the striker 53 is not able to be detached from the slit 57a of the hook 57.

(Assembling Method)

Figure 6:
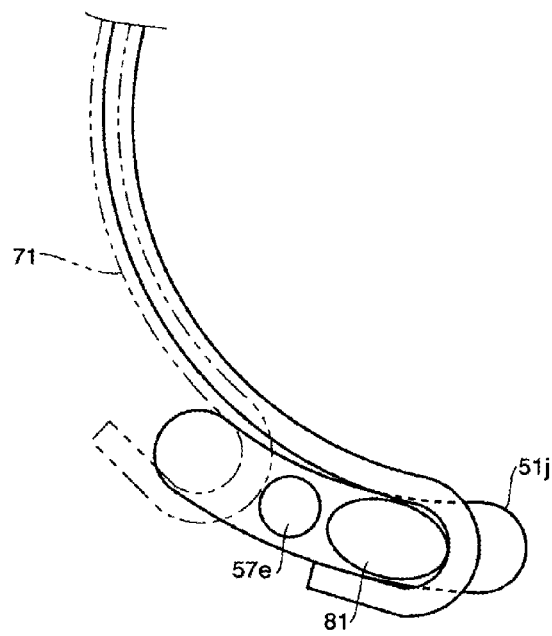
FIG. 6 is a view for explaining the assembly of the lock device of the present embodiment.

Next, a method of assembling the lock device having the above configuration will be described with reference to FIG. 1 to FIG. 3 and FIG. 6. FIG. 6 is a view for explaining the assembly of the lock device of the present embodiment.

First, the cylindrical portion 45a of the bushing 45 is inserted into the hole 51h of the base 51 from the back surface side of the base 51. Further, the cylindrical portion 47a of the bushing 47 is inserted into the hole 51i of the base 51 from the back surface side of the base 51. At this time, the cylindrical portion 45a of the bushing 45 and the cylindrical portion 47a of the bushing 47 are protruded beyond the front surface of the base 51.

Subsequently, the first spring 71 is placed on one side of the base 51, and the inner end of the first spring 71 is locked to the first protrusion 51b. At this time, the outer end of the first spring 71 in the natural state is located at one end side of the elongated hole 51j, as indicated by a two-dot chain line in FIG. 6.

By using a rod-shaped jig 81 from the back surface side of the base 51, the outer end of the first spring 71 in the natural state is displaced to the other end side (position indicated by a solid line in FIG. 6) of the elongated hole 51j along the elongated hole 51j. At this time, the diameter of the first spring 71 becomes smaller than in the natural state, and an elastic repulsive force is thus generated.

The hole 57h of the hook 57 is inserted to the cylindrical portion 45a of the bushing 45 protruding from the front surface side of the base 51 so that the protrusion 57e of the hook 57 is overlapped with the elongated hole 51j. Then, the jig 81 is removed and the diameter of the first spring 71 is thus enlarged by the elastic repulsive force. As a result, the outer end of the first spring 71 is displaced to one end direction of the elongated hole 51j and locked to the protrusion 57e of the hook 57.

Further, the second spring 73 is placed on the front surface of the base 51 and the inner end of the second spring 73 is locked to the fourth protrusion 51e. At this time, similar to the first spring 71, the outer end of the second spring 73 in the natural state is located at one end side of the elongated hole 51k.

By using a rod-shaped jig from the back surface side of the base 51, the outer end of the second spring 73 in the natural state is displaced to the other end side of the elongated hole 51k along the elongated hole 51k. At this time, the diameter of the second spring 73 becomes smaller than in the natural state, and an elastic repulsive force is thus generated.

The hole 61h of the pawl 61 is inserted to the cylindrical portion 47a of the bushing 47 protruding from the front surface side of the base 51 so that the protrusion 61e of the pawl 61 is overlapped with the elongated hole 51k. Then, when the jig is removed, the diameter of the second spring 73 is thus enlarged by the elastic repulsive force. As a result, the outer end of the second spring 73 is displaced to one end direction of the elongated hole 51k and locked to the protrusion 61e of the pawl 61.

(Effects)

According to the above configurations, the following effects is able to be achieved.

(1) The first protrusion 51b is provided on the base 51. The first protrusion 51b is protruded in a direction parallel to the rotation axis and the end of the first spring 71 is fixed to the first protrusion 51b. Further, the protruding length in the rotation axis direction of the first protrusion 51b is longer than the length in the rotation axis direction of the first spring 71.

First, the end of the first spring 71 is fixed to the first protrusion 51b. Therefore, the first protrusion 51b has a function of fixing the end of the first spring 71.

Further, the first protrusion 51b has a function of securing a space for allowing the first spring 71 to be reliably actuated. For example, an external force is applied to the base 51 of the lock device, so that the base 51 is bent to be closer to the hook 57, so that a space between the base 51 and the hook 57 is often narrowed. The first spring 71 is accommodated in this space.

In the case where, unlike the present embodiment, the first protrusion 51b is not provided, the space between the base and the hook is narrowed and therefore the first spring often contacts the base or the hook. When the first spring is subjected to the urging force from the base and the hook, there is a possibility that the first spring is not able to apply a force as intended to the hook.

However, according to the lock device of the present embodiment described above, the protruding length of the first protrusion 51b is longer than the length in the rotation axis direction of the first spring 71. Therefore, even when the space between the base 51 and the hook 57 is narrowed, the apex of the first protrusion 51b comes into contact with the hook 57 before the first spring 71 comes into contact with the base 51. Furthermore, the first protrusion 51b functions as a tension rod and thus prevents the space between the base 51 and the hook 57 from being further narrowed. That is, the first protrusion 51b also has a function of securing a space, between the base 51 and the hook 57, for allowing the first spring 71 to be deformed.

In this way, according to the lock device of the present embodiment, the first protrusion 51b has two functions, i.e., a function of fixing the end of the first spring 71 and a function of securing a space for allowing the first spring 71 to be deformed. Therefore, the lock device is able to be simply configured.

Further, especially, in the present embodiment, the first protrusion 51b that fixes the inner end of the first spring 71 has a function of securing the space described above. That is, since the first protrusion 51b is located near the first spring 71, it is easy to secure the space so as not to hinder the elastic deformation of the first spring 71.

In this way, the first protrusion 51b of the present embodiment is provided at a position where the space is able to be effectively and easily secured and the interference with the first spring 71 is avoided.

Further, the fourth protrusion 51e also functions in the same manner as the first protrusion 51b. That is, the fourth protrusion 51e has a function of fixing one end of the second spring 73 and a function of securing a space, between the base 51 and the pawl 61, for allowing the second spring 73 to be deformed.

(2) According to the present embodiment, the second protrusion 51c and the third protrusion 51d, which extend between the hook 57 and the base 51, are provided on the base 51. The second protrusion 51c and the third protrusion 51d have a function of securing the space, between the base 51 and the hook 57, for allowing the first spring 71 to be deformed. As a result, it is easier to secure the space between the base 51 and the hook 57.

Further, the fifth protrusion 51*f* and the sixth protrusion 51*g*, which extend between the pawl 61 and the base 51, are provided on the base 51. The fifth protrusion 51*f* and the sixth protrusion 51*g* have a function of securing the space, between the base 51 and the pawl 61, for allowing the second spring 73 to be deformed. As a result, it is easier to secure the space between the base 51 and the pawl 61.

(3) According to the present embodiment, the first protrusion 51*b*, the second protrusion 51*c* and the third protrusion 51*d* are provided on the base 51. The base 51 and the hook 57 are contacted, at three points, by the first protrusion 51*b*, the second protrusion 51*c* and the third protrusion 51*d*. As a result, the posture of the hook 57 relative to the base 51 is stabilized.

Meanwhile, in the above-described embodiment, an example has been described where the first protrusion 51*b*, the second protrusion 51*c* and the third protrusion 51*d* contact, at one point, the hook 57, respectively. However, the present invention is not limited thereto. For example, the second protrusion 51*c* and the third protrusion 51*d* may be omitted, and the hook 57 may contact, at three points, with the base 51 by the first protrusion 51*b*.

In the above-described embodiment, all of the first protrusion 51*b*, the second protrusion 51*c* and the third protrusion 51*d* are provided on the base 51. However, alternatively, any one of the first protrusion 51*b*, the second protrusion 51*c* and the third protrusion 51*d* may be provided on the base 51 and the other thereof may be provided on the hook 57.

Naturally, it is not essential to cause the apex of the first protrusion 51*b* to be always in contact with the hook 57 in order to achieve the effect (1) described above. The lock device may be configured so that the apex of the first protrusion 51*b* is not in contact with the hook 57 in a state where an external force is not applied to the base 51 and the apex of the first protrusion 51*b* contacts the hook 57 in a state where the base 51 is deformed to be closer to the hook 57.

Similarly, the base 51 and the pawl 61 are in contact, at three points, with each other by the fourth protrusion 51*e*, the fifth protrusion 51*f* and the sixth protrusion 51*g*. Therefore, the posture of the pawl 61 relative to the base 51 is stabilized.

(4) According to the present embodiment, the first spring 71 is a flat spiral spring centered on the rotation axis of the hook 57. Further, the second protrusion 51*c* and the third protrusion 51*d* are provided at a position of being in contact with an outer peripheral surface of the flat spiral spring.

When being elastically deformed, the variation amount of the outer peripheral surface of the flat spiral spring is small. Therefore, in the case where the second protrusion 51*c* and the third protrusion 51*d* are provided at a position of being in contact with the outer peripheral surface of the first spring 71, the second protrusion 51*c* and the third protrusion 51*d* are less likely to interfere with the first spring 71 even when the first spring 71 is elastically deformed.

Further, the second spring 73 is a flat spiral spring centered on the rotation axis of the pawl 61. Further, the fifth protrusion 51*f* and the sixth protrusion 51*g* are provided at a position of being in contact with an outer peripheral surface of the flat spiral spring. As a result, the fifth protrusion 51*f* and the sixth protrusion 51*g* are less likely to interfere with the second spring 73 even when the second spring 73 is elastically deformed.

In addition, the present invention is not limited to the above embodiments but is able to be modified as follows.

In the above embodiment, three protrusions of the first protrusion 51*b*, the second protrusion 51*c* and the third protrusion 51*d*, each of which has the arc shape, are provided in order to rotate the hook 57 in a stable posture. However, the hook 57 may be stably rotated by two protrusions, depending on the shape of the protrusion. Further, it is possible to achieve a function of securing a space, between the hook 57 and the base 51, for allowing the first spring 71 to be reliably actuated.

Similarly, three protrusions of the fourth protrusion 51*e*, the fifth protrusion 51*f* and the sixth protrusion 51*g*, each of which has the arc shape, are provided in order to rotate the pawl 61 in a stable posture. However, the pawl 61 may be stably rotated by two protrusions, depending on the shape of the protrusion. Further, it is possible to achieve a function of securing a space, between the pawl 61 and the base 51, for allowing the second spring 73 to be reliably actuated.

In the above embodiment, the inner end of the first spring 71 is locked by the protrusion of the base 51 and the outer end of the first spring 71 is locked by the protrusion of the hook 57. However, on the contrary, the outer end of the first spring 71 may be locked by the protrusion of the base 51 and the inner end of the first spring 71 may be locked by the protrusion of the hook 57.

Similarly, the inner end of the second spring 73 is locked by the protrusion of the base 51, and the outer end of the second spring 73 is locked by the protrusion of the pawl 61. However, on the contrary, the outer end of the second spring 73 may be locked by the protrusion of the base 51, and the inner end of the second spring 73 may be locked by the protrusion of the pawl 61.

In the above embodiment, for the purpose of rotating the hook 57 in a stable posture, three protrusions of the first protrusion 51*b*, the second protrusion 51*c* and the third protrusion 51*d*, each of which has the arc shape, are provided on the base 51. However, on the contrary, these protrusions may be provided on the hook 57.

Similarly, for the purpose of rotating the pawl 61 in a stable posture, three protrusions of the fourth protrusion 51*e*, the fifth protrusion 51*f* and the sixth protrusion 51*g*, each of which has the arc shape, are provided on the base 51. However, on the contrary, they may be provided on the pawl 61.

Further, the first protrusion 51*b* may be provided on the base 51 and the fourth protrusion 51*e* may be provided on the pawl 61. Alternatively, the first protrusion 51*b* may be provided on the base 51 and the fourth protrusion 51*e* may be omitted.

Further, in the above-described embodiment, an example has been described where the relative rotation between the hook 57 and the pawl 61 is locked when the convex portion 61*a* and the concave portion 57*d* are in contact. The present invention is not limited thereto. In the lock device of the present embodiment, a mechanism for realizing the locking of a known lock device is able to be employed as the mechanism for locking the relative rotation between the hook 57 and the pawl 61.

Further, in the above-described embodiment, an example has been described where the slit 57*a* penetrating from the front surface to the back surface of the hook 57 is used as the striker receiving portion. However, a groove formed on the front surface of the hook 57 may be used as the striker receiving portion.

Further, in the above-described embodiment, an example has been described where the bushing 45 is inserted through the hook 57 from the back surface of the base 51 and the bushing 47 is inserted through the pawl 61 from the back surface of the base 51. However, the present invention is not limited thereto. The bushing 45 inserted through the hook 57 may be mounted to the base 51 from the front surface side thereof. Alternatively, the bushing 47 inserted through the pawl 61 may be mounted to the base 51 from the front surface side thereof.

Further, in the above-described embodiment, an example has been described where the first protrusion 51$b$ is set to be greater than the length in the rotation axis direction of the first spring 71. However, the present invention is not limited thereto. Instead of the first protrusion 51$b$, the protrusion 57$e$ of the hook 57 may be set to be greater than the length in the rotation axis direction of the first spring 71. In this way, it may cause the protrusion 57$e$ to function as a tension rod between the hook 57 and the base 51. Alternatively, both of the first protrusion 51$b$ and the protrusion 57$e$ may be set to be greater than the length in the rotation axis direction of the first spring 71. In this way, it may cause both protrusions to function as a tension rod between the hook 57 and the base 51. Further, in the case where at least one of the first protrusion 51$b$ and the protrusion 57$e$ is set to be sufficiently greater than the length in the rotation axis direction of the first spring 71, instead of the fourth protrusion 51$e$ or the protrusion 61$e$ of the pawl 61, at least one of the first protrusion 51$b$ and the protrusion 57$e$ may function as a tension rod between the pawl 61 and the base 51. In this way, it is also possible to secure the space for allowing the second spring 73 to be reliably actuated. Furthermore, the fourth protrusion 51$e$ or the protrusion 61$e$ of the pawl 61 may function as a tension rod between the pawl 61 and the base 51 or a tension rod between the hook 57 and the base 51.

Second Embodiment

Figure 7:
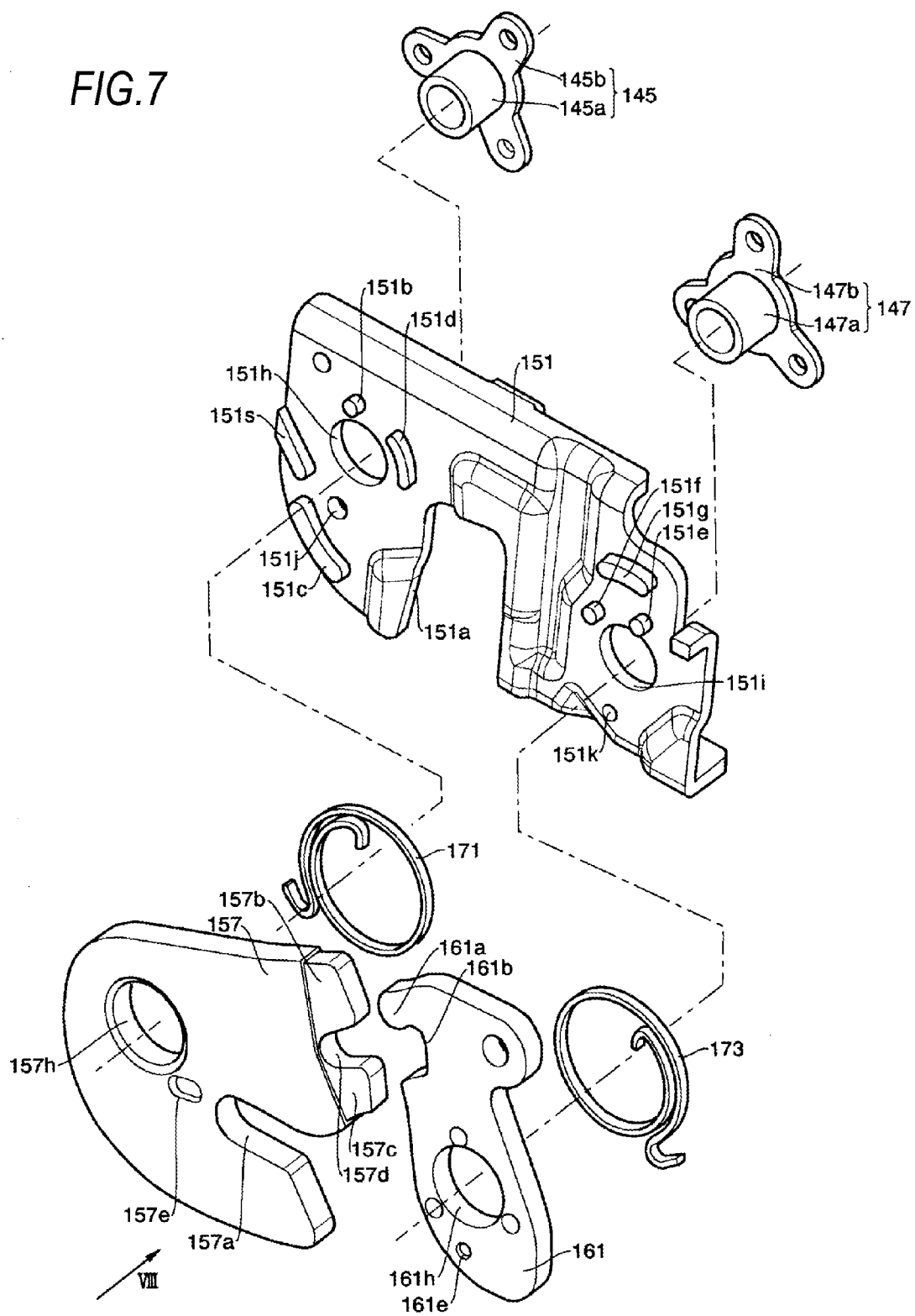
FIG. 7 is an exploded perspective view of a lock device according to a second embodiment of the present invention.
Figure 8:
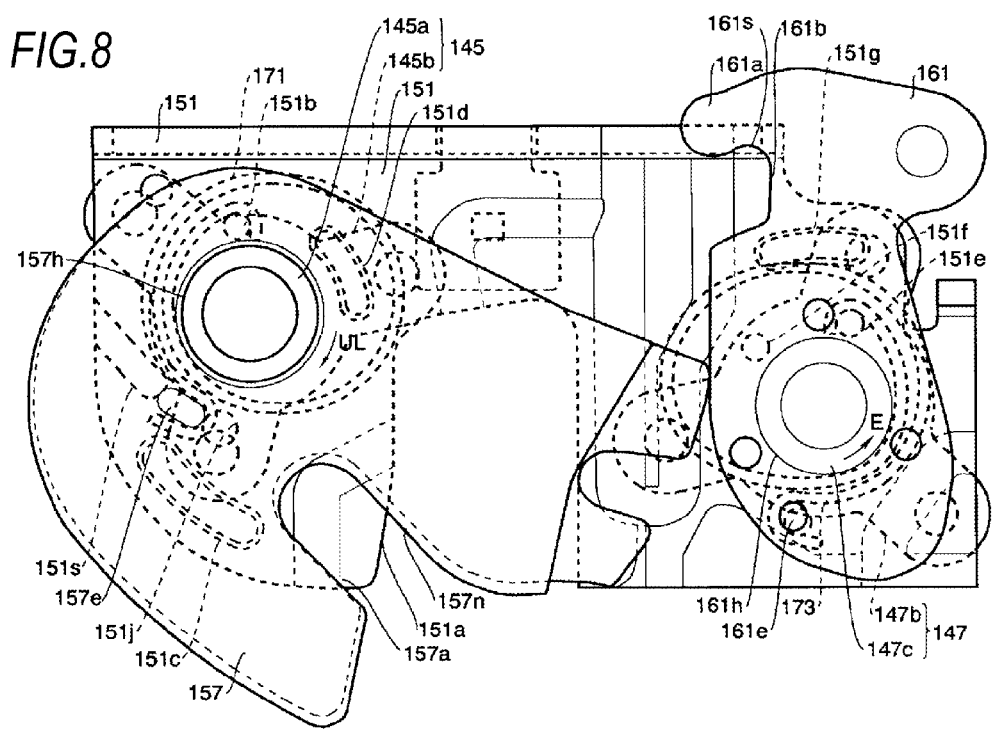
FIG. 8 is a view showing an unlocked state of the lock device shown in FIG. 7, as seen from a direction VIII of FIG. 7.
Figure 9:
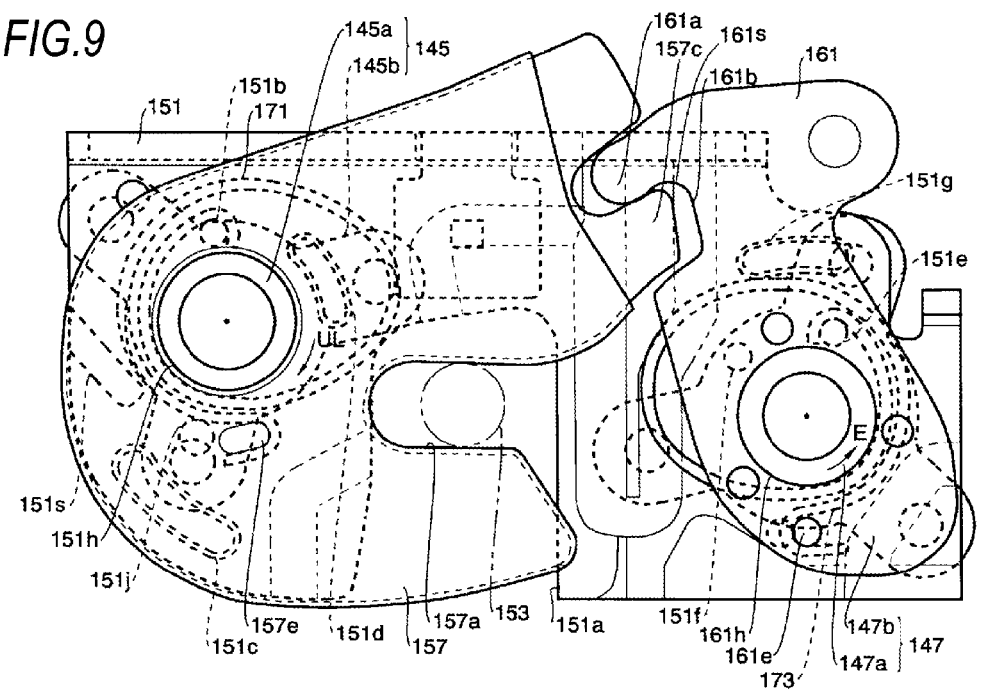
FIG. 9 is a view showing a locked state of the lock device shown in FIG. 8.

A second embodiment of the present invention will be described with reference to the drawings. FIG. 7 is an exploded perspective view of a lock device according to a second embodiment. FIG. 8 is a view showing an unlocked state of the lock device shown in FIG. 7, as seen from a direction VIII of FIG. 7. FIG. 9 is a view showing a locked state of the lock device shown in FIG. 8.

Also in the present embodiment, the lock device includes a base 151 and a striker 153. For example, the base 151 is fixed to a vehicle body frame and the striker 153 is fixed to a door. As the door is moved relative to the vehicle body frame, the striker 153 is moved relative to the base 151.

The base 151 is a plate-shaped member having a front surface and a back surface. In FIG. 7, a surface facing the lower left is the front surface and a surface facing the upper right is the back surface. The base 151 is provided with a notch 151$a$. The notch 151$a$ penetrates the base 151 from the front surface to the back surface. The striker 153 (see FIG. 9) is able to be moved in the notch 151$a$. In the following description, with respect to the notch 151$a$ in FIG. 7 as a border, a left side of the base 151 is referred to as a left portion of the base 151 and a right side of the base 151 is referred to as a right portion of the base 151.

A hook 157 (an example of a first rotation member) is provided on the front surface of the left portion of the base 151 with respect to the slit 151$a$. The hook 157 is a plate-shaped member extending substantially parallel to the base 151. The hook 157 is formed with a hole 157$h$ penetrating from the front surface to the back surface. The base 151 is also formed with a through hole 151$h$. The diameter of the hole 151$h$ is set to be substantially the same as the diameter of the hole 157$h$ of the hook 157.

A bushing 145 is provided on the front surface of the right portion of the base 151. The bushing 145 includes a cylindrical portion 145$a$ and a mounting portion 145$b$. The cylindrical portion 145$a$ is inserted into the hole 151$h$ of the base 151. The mounting portion 145$b$ is formed at a base portion of the cylindrical portion 145$a$ and abutted against the back surface of the base 151.

The outer diameter of the cylindrical portion 145$a$ is set to be slightly smaller than the hole 157$h$ of the hook 157. The cylindrical portion 145$a$ is inserted through the hole 151$h$ of the base 151 and then inserted through the hole 157$h$ of the hook 157. A leading end of the cylindrical portion 145$a$ passing through the hole 157$h$ of the hook 157 is caulked. Therefore, the hook 157 is able to be rotated around a rotation axis that extends in a direction intersecting the base 151.

Further, in the present embodiment, the position of the hook 157 shown in FIG. 8 is referred to as an unlock position, and the position of the hook 157 shown in FIG. 9 is referred to as a lock position.

A pawl 161 (an example of a second rotation member) is rotatably provided on the front surface of the right portion of the base 151. The pawl 161 is a plate-shaped member extending parallel to the base 151. The pawl 161 is formed with a hole 161$h$ penetrating from the front surface to the back surface. The base 151 is also formed with a hole 151$i$ penetrating from the front surface to the back surface. The diameter of the hole 151$i$ of the base 151 is set to be substantially the same as the diameter of the hole 161$h$ of the pawl 161.

A bushing 147 is provided on the back surface of the right portion of the base 151. The bushing 147 includes a cylindrical portion 147$a$ and a mounting portion 147$b$. The cylindrical portion 147$a$ is inserted into the hole 151$i$ of the base 151. The mounting portion 147$b$ is formed at a base portion of the cylindrical portion 147$a$ and abutted against the back surface of the base 151.

The outer diameter of the cylindrical portion 147$a$ is set to be slightly smaller than the hole 161$h$ of the pawl 161. The cylindrical portion 147$a$ is inserted through the hole 151$i$ of the base 151 and then inserted through the hole 161$h$ of the pawl 161. A leading end of the cylindrical portion 147$a$ passing through the hole 161$h$ of the pawl 161 is caulked. Therefore, the pawl 161 is able to be rotated around a rotation axis that extends in a direction intersecting the base 151.

The hook 157 is formed with a slit 157$a$ (an example of a striker receiving portion) penetrating from the front surface to the back surface. The striker 153 is able to be moved in the slit 157$a$.

Further, a first convex portion 157$b$ and a second convex portion 157$c$ are formed on an outer peripheral portion of the hook 157. A concave portion 157$d$ is formed between the first convex portion 157$b$ and the second convex portion 157$c$. The concave portion 157$d$ is gradually thinned from the outer peripheral surface toward the inside.

A convex portion 161$a$ is formed at a surface of the pawl 161 opposite to the hook 157. The convex portion 161$a$ is able to be engaged and disengaged from the concave portion 157$d$ of the hook 157. The convex portion 161$a$ has an arc-shaped leading end and a recessed root portion 161$s$. Further, a concave portion 161$b$ is formed at a surface of the pawl 161 opposite to the hook 157. The second convex portion 157$c$ of the hook 157 is able to be introduced into the concave portion 157$c$.

As described above, the hook 157 and the pawl 161 are provided on the front surface of the plate-shaped base 151. Further, each of the hook 157 and the pawl 161 is a member that is able to be rotated around the rotation axis parallel to each other. Furthermore, at least a portion of the hook 157 and the pawl 161, for example, the convex portion 161a and the concave portion 157d are in contact with each other, so that it is possible to lock the relative rotation in at least one direction of the hook 157 and the pawl 161.

(First Elastic Member and Second Elastic Member)

A first spring 171 (an example of a first elastic member) is provided between the base 151 and the hook 157. The first spring 171 applies a force to the hook 157 so as to rotate the hook 157 in a clockwise direction (an arrow UL in FIG. 8 and FIG. 9). The first spring 171 is provided in a posture where a center axis of the first spring 171 is parallel to a rotation axis of the hook 157. The first spring 171 is provided between the base 151 and the hook 157.

Further, a second spring 173 (an example of a second elastic member) is provided between the base 151 and the pawl 161. The second spring 173 applies a force to the pawl 161 so as to rotate the pawl 161 in a counterclockwise direction (an arrow E in FIG. 8 and FIG. 9). The second spring 173 is provided in a posture where a center axis of the second spring 173 is parallel to a rotation axis of the pawl 161 and is provided in a space between the base 151 and the pawl 161.

(Protrusion)

On the front surface of the base 151 where the hook 157 and the pawl 161 are provided, a first protrusion 151b (an example of a protrusion), a second protrusion 151c (an example of an auxiliary protrusion), a third protrusion 151d (an example of an auxiliary protrusion) and a stopper protrusion 151s, which are protruded toward the hook 157 in the rotation axis direction of the hook 157, are formed around the hole 151h for the hook 157. The hook 157 is supported at three points by the apices of at least three protrusions of these four protrusions. The height (dimension of the protrusion in the rotation axis direction of the hook 157) to the apices of these four protrusions is set to be greater than the dimension of the first spring 171 in the rotation axis direction of the hook 157.

Further, the base 151 is formed with a hole 151j. On the other hand, as shown in FIG. 7, the hook 157 is formed with a protrusion 157e protruding toward the base 151. The height of the protrusion 157e is set to the height in which the protrusion does not abut against the base 151. Furthermore, the protrusion 157e is formed at a position where the protrusion passes over the hole 151j of the base 151 and is able to be abutted against the stopper protrusion 151s on the base 151 when the hook 157 is rotated in the direction of the arrow UL.

On the front surface of the base 151 where the hook 157 and the pawl 161 are provided, a fourth protrusion 151e (an example of a protrusion), a fifth protrusion 151f (an example of an auxiliary protrusion) and a sixth protrusion 151g (an example of an auxiliary protrusion), which are protruded toward the pawl 161 in the rotation axis direction of the pawl 161, are also formed around the hole 151i for the pawl 161. The pawl 161 is supported at three points by the apices of these three protrusions. The height (dimension of the protrusion in the rotation axis direction of the pawl 161) from the front surface of the base 151 to the apices of these three protrusions is set to be greater than the dimension of the second spring 173 in the rotation axis direction of the pawl 161.

Further, the base 151 is formed with a hole 151k. On the other hand, as shown in FIG. 7, the pawl 161 is formed with a protrusion 161e protruding toward the base 151. The height of the protrusion 161e is set to the height in which the protrusion does not abut against the base 151. Furthermore, the protrusion 161e is formed at a position where the protrusion passes over the hole 151k of the base 151 when the pawl 161 is rotated.

An inner end of the first spring 171 described above is locked to the first protrusion 151b of the base 151 and an outer end thereof is locked to the protrusion 157e of the hook 157. The first spring 171 is adapted to urge the hook 157 in the clockwise direction.

Further, an inner end of the second spring 173 described above is locked to the fourth protrusion 151e of the base 151, and an outer end thereof is locked to the protrusion 161e of the pawl 161. The second spring 173 is adapted to urge the pawl 161 in the counterclockwise direction.

As described above, the first protrusion 151b to which the inner end of the first spring 171 is fixed is provided on the base 151. The protruding length (length from the front surface of the base 151 to the apex of the first protrusion 51b) of the first protrusion 151b in the rotation axis direction of the hook 157 is set to be greater than the length of the first spring 171 in the rotation axis direction of the hook 57.

Further, in the present embodiment, similar to the first spring 171, the fourth protrusion 151e to which the inner end of the second spring 173 is fixed is provided on the base 151. The protruding length of the fourth protrusion 151e in the rotation axis direction of the pawl 161 is set to be greater than the length of the second spring 173 in the rotation axis direction of the pawl 161.

(Locked State and Unlocked State)

Next, an operation of the above configuration will be described.

In the state of FIG. 9 where the hook 157 is in the lock position, the concave portion 157d of the hook 157 is engaged with the convex portion 161a of the pawl 161. In this locked state, the hook 157 is prevented from being rotated and the striker 153 is prevented from being detached from the slit 157a of the hook 157. That is, when the relative rotation between the hook 157 and the pawl 161 is locked, the lock device becomes the locked state where the striker 153 is prevented from being detached from the slit 157a.

Here, when the pawl 161 is rotated in the opposite direction (clockwise direction) of the arrow E against the urging force of the second spring 173, the engagement between the concave portion 157d of the hook 157 and the convex portion 161a of the pawl 161 is released. Then, the hook 157 is rotated in the clockwise direction by the urging force of the first spring 171, so that the lock device becomes the unlocked state shown in FIG. 8. Accordingly, the striker 153 is allowed to be detached from the slit 157a of the hook 157. That is, when the locking of the relative rotation between the hook 157 and the pawl 161 is released, the lock device becomes the unlocked state where the striker 153 is allowed to be detached from the slit 157a.

Meanwhile, in the present embodiment, the stopper protrusion 151s is formed on the front surface of the base 151, on which the hook 157 is provided. The protrusion 157e of the hook 157 in the unlock position is abutted against the stopper protrusion 151s, so that the further rotation in the unlock position direction is prevented.

On the contrary, in the unlocked state shown in FIG. 8, when a mouth-near surface 157n of the slit 157a of the hook 157 is pressed by the striker 153, the hook 157 is rotated in the lock position direction against the urging force of the first spring 171. Further, the concave portion 157d of the hook 157 is engaged with the convex portion 161a of the pawl 161, so that the hook 157 is prevented from being rotated in the unlock direction. As a result, the lock device becomes the locked state where the striker 153 is not able to be detached from the slit 157a of the hook 157.

(Assembling Method)

Next, a method of assembling the lock device having the above configuration will be described with reference to FIG. 7 to FIG. 9.

First, the cylindrical portion 145a of the bushing 145 is inserted into the hole 151h of the base 151 from the back surface side of the base 151. Further, the cylindrical portion 147a of the bushing 147 is inserted into the hole 151i of the base 151 from the back surface side of the base 151. At this time, the cylindrical portion 145a of the bushing 145 and the cylindrical portion 147a of the bushing 147 are protruded beyond the front surface of the base 151.

Subsequently, the first spring 171 is placed on the front surface of the base 151 and the inner end of the first spring 171 is locked to the first protrusion 151b. Further, the outer end of the first spring 171 is held, through the hole 151j from the back surface of the base 151, in a state where the elastic force of the first spring 171 is generated. The hook 157 is placed on the first spring 171. The protrusion 157e of the hook 157 is located in a direction in which the outer end of the first spring 171 is moved when the force of holding the outer end of the first spring 171 is released. Then, the force of holding the outer end of the first spring 171 is released, so that the outer end of the first spring 171 is locked to the protrusion 157e of the hook 157.

Additionally, the second spring 173 is placed on the front surface of the base 151 and the inner end of the second spring 173 is locked to the fourth protrusion 151e. Further, the outer end of the second spring 173 is held, through the hole 151k from the back surface of the base 151, in a state where the elastic force of the second spring 173 is generated. The pawl 161 is placed on the second spring 173. The protrusion 161e of the pawl 161 is located in a direction in which the outer end of the second spring 173 is moved when the force of holding the outer end of the second spring 173 is released. Then, the force of holding the outer end of the second spring 173 is released, so that the outer end of the second spring 173 is locked to the protrusion 161e of the pawl 161.

(Effects)

According to the above configurations, the following effects will be achieved.

(1) The first protrusion 151b is provided on the base 151. The first protrusion 151b is protruded in a direction parallel to the rotation axis and the end of the first spring 171 is fixed to the first protrusion 151b. Further, the protruding length in the rotation axis direction of the first protrusion 151b is longer than the length in the rotation axis direction of the first spring 171.

Similar to the first embodiment described above, the first protrusion 151b has two functions, i.e., a function of fixing the end of the first spring 171 and a function of securing a space for allowing the first spring 171 to be deformed. Therefore, the lock device is able to be simply configured.

Further, especially, in the present embodiment, the first protrusion 151b that fixes the inner end of the first spring 171 has a function of securing the space described above. That is, since the first protrusion 151b is located near the first spring 171, it is easy to secure the space so as not to hinder the elastic deformation of the first spring 171. Furthermore, the first protrusion 151b of the present embodiment is provided at a position where the space is able to be effectively and easily secured and the interference with the first spring 171 is avoided.

Further, the fourth protrusion 151e also functions in the same manner as the first protrusion 51b. That is, the fourth protrusion 151e has a function of fixing one end of the second spring 173 and a function of securing a space, between the base 151 and the pawl 161, for allowing the second spring 173 to be deformed.

(2) According to the present embodiment, the second protrusion 151c and the third protrusion 151d, which extend between the hook 157 and the base 151, are provided on the base 151. The second protrusion 151c and the third protrusion 151d have a function of securing the space, between the base 151 and the hook 157, for allowing the first spring 171 to be deformed. As a result, it is easier to secure the space between the base 151 and the hook 157.

Further, the fifth protrusion 151f and the sixth protrusion 151g, which extend between the pawl 161 and the base 151, are provided on the base 151. The fifth protrusion 151f and the sixth protrusion 151g have a function of securing the space, between the base 151 and the pawl 161, for allowing the second spring 173 to be deformed. As a result, it is easier to secure the space between the base 151 and the pawl 161.

(3) According to the present embodiment, the first protrusion 151b, the second protrusion 151c and the third protrusion 151d are provided on the base 151. The base 151 and the hook 157 are in contact, at three points, with each other by the first protrusion 151b, the second protrusion 151c and the third protrusion 151d. As a result, the posture of the hook 157 relative to the base 151 is stabilized.

Similarly, the base 151 and the pawl 161 are in contact, at three points, with each other by the fourth protrusion 151e, the fifth protrusion 151f and the sixth protrusion 151g. Therefore, the posture of the pawl 161 relative to the base 151 is stabilized.

(4) According to the present embodiment, the first spring 171 is a flat spiral spring centered on the rotation axis of the hook 157.

Further, the second spring 173 is a flat spiral spring centered on the rotation axis of the pawl 161. Further, the fifth protrusion 151f and the sixth protrusion 151g are provided at a position of being in contact with an outer peripheral surface of the flat spiral spring. As a result, the fifth protrusion 151f and the sixth protrusion 151g are less likely to interfere with the second spring 173 even when the second spring 173 is elastically deformed.

(5) The first protrusion 151b is provided on the hook 157. As the first protrusion 151b contacts the stopper protrusion 151s provided on the front surface of the base 151, the rotation of the hook 157 relative to the base 151 is regulated. In this way, it is possible to reduce the size of the base 151 and the hook 157.

This application is based upon Japanese Patent Application (Patent Application No. 2012-271339) filed on Dec. 12, 2012, the contents of which are incorporated herein by reference.

REFERENCE NUMERALS LIST

51 Base
53 Striker
51b First protrusion (an example of protrusion)
51e Fourth protrusion (an example of protrusion)
57 Hook (an example of first rotation member)
61 Pawl (an example of second rotation member)
71 First spring (an example of first elastic member)
73 Second spring (an example of second elastic member)

What is claimed is:

1. A lock device comprising:

a plate-shaped base having a front surface and a back surface;

a first rotation member and a second rotation member, which are each provided on the front surface of the base and are each rotated around a rotation axis parallel to each other, wherein at least a portion of the first rotation member and the second rotation member contacts each other, so that relative rotation in at least one direction of the first rotation member and the second rotation member is able to be locked;

a striker, which is able to be moved into engagement with a striker receiving portion provided on the first rotation member;

a first elastic member, which is provided in a space between the base and the first rotation member;

a second elastic member, which is provided in a space between the base and the second rotation member, wherein, when the relative rotation in at least one direction of the first rotation member and the second rotation member is locked, the lock device is in a locked state in which the striker is prevented from being disengaged from the striker receiving portion, wherein, when the locking of the relative rotation in at least one direction of the first rotation member and the second rotation member is released, the lock device is in an unlocked state which is the striker is allowed to be disengaged from the striker receiving portion, wherein the first elastic member applies a force to the first rotation member to rotate the first rotation member in one direction around its rotation axis, wherein the second elastic member applies a force to the second rotation member to rotate the second rotation member in one direction around its rotation axis, wherein a protrusion is provided on the base, the protrusion protruding in a direction parallel to one of the rotation axes of the first rotation member and the second rotation member and an end of one of the first elastic member being fixed to the protrusion, wherein an apex of the protrusion comes into contact with the first rotation member, and wherein a protruding height of the protrusion in the direction parallel to one of the rotation axes of the first rotation member and the second rotation member is greater than a width of the first elastic member in the direction parallel to one of the rotation axes of the first rotation member and the second rotation member.

2. The lock device according to claim 1, wherein an auxiliary protrusion is provided on one of the base and one of the first rotation member and the second rotation member, the auxiliary protrusion extending between the base and one of the first rotation member and the second rotation member, and wherein the auxiliary protrusion protrudes to extend in the same direction as the protruding height of the protrusion.

3. The lock device according to claim 2, wherein the auxiliary protrusion is provided on the base, and wherein the apex of the protrusion and the auxiliary protrusion are in contact, at two points, with the first rotation member.

4. The lock device according to claim 2, wherein at least one of the first elastic member and the second elastic member comprises a flat spiral spring centered on a corresponding one of the rotation axes of the first rotation member and of the second rotation member, and wherein the auxiliary protrusion is provided at a position of being in contact with an outer peripheral surface of the flat spiral spring of the first elastic member.

5. The lock device according to claim 1, wherein each of the first elastic member and the second elastic member has an outer end, an inner end, and an intermediate portion that is provided between the outer end and the inner end, and wherein the protruding height of the protrusion is greater than a width of the intermediate portion in the direction parallel to one of the rotation axes of the first rotation member and the second rotation member.

* * * * *